United States Patent
Gusikhin

(10) Patent No.: US 10,801,849 B2
(45) Date of Patent: Oct. 13, 2020

(54) UNOBSERVED CONTENT FOR ON DEMAND TOURS

(71) Applicant: Ford Global Technologies, LLC, Dearborn, MI (US)

(72) Inventor: Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 15/943,143

(22) Filed: Apr. 2, 2018

(65) Prior Publication Data

US 2019/0301879 A1    Oct. 3, 2019

(51) Int. Cl.
| | |
|---|---|
| *G01C 21/34* | (2006.01) |
| *G01C 21/36* | (2006.01) |
| *G08G 1/0968* | (2006.01) |

(52) U.S. Cl.
CPC ..... *G01C 21/3476* (2013.01); *G01C 21/3484* (2013.01); *G01C 21/3641* (2013.01); *G01C 21/3644* (2013.01); *G01C 21/3697* (2013.01); *G08G 1/096838* (2013.01)

(58) Field of Classification Search
CPC ............ G01C 21/3476; G01C 21/3697; G01C 21/3484; G01C 21/3641; G01C 21/3644; G08G 1/096838
See application file for complete search history.

(56) References Cited

U.S. PATENT DOCUMENTS

| | | | |
|---|---|---|---|
| 5,802,492 A | 9/1998 | DeLorme et al. | |
| 6,321,158 B1 * | 11/2001 | DeLorme et al. | G01C 21/3476 701/426 |
| 7,197,395 B2 * | 3/2007 | Kishigami | G01C 21/3641 701/428 |
| 9,989,367 B2 * | 6/2018 | Bartels et al. | G01C 21/3641 |
| 2008/0129528 A1 | 6/2008 | Guthrie | |
| 2009/0005965 A1 * | 1/2009 | Forstall et al. | G01C 21/3484 701/533 |
| 2012/0036467 A1 | 2/2012 | Tom et al. | |
| 2012/0095675 A1 | 4/2012 | Tom et al. | |
| 2018/0188054 A1 * | 7/2018 | Kennedy et al. | G01C 21/3484 |
| 2019/0086223 A1 * | 3/2019 | Tanaka et al. | G01C 21/3476 |

FOREIGN PATENT DOCUMENTS

WO    WO2019079861 A1 *  5/2019  ............. H04W 4/33

* cited by examiner

*Primary Examiner* — Dale W Hilgendorf
(74) *Attorney, Agent, or Firm* — Michael Spenner; Brooks Kushman, P.C.

(57) ABSTRACT

A method includes generating by a controller autonomous commands for the vehicle with an altered route such that the destination is maintained and the repeated segment is replaced with an alternate segment having unobserved tour content for the occupant. The generation is responsive to receiving a route having a destination of a vehicle and a repeated segment previously traversed by an occupant where tour content was presented to the occupant while the repeated segment was traversed.

18 Claims, 3 Drawing Sheets

UNOBSERVED CONTENT FOR ON DEMAND TOURS

TECHNICAL FIELD

This disclosure relates to providing unobserved content for on demand tours.

BACKGROUND

Tour information may be provided to travelers as they commute to and from destinations. For example, a business traveler may be in town for a week during a conference. The conference may take place at a conference center, requiring a commute from the traveler's hotel to the conference center along the same route every day. The traveler may observe tour content related to points of interest during the commute, but the content may become repetitious.

SUMMARY

A method includes generating by a controller autonomous commands for the vehicle with an altered route such that the destination is maintained and the repeated segment is replaced with an alternate segment having unobserved tour content for the occupant. The generation is responsive to receiving a route having a destination of a vehicle and a repeated segment previously traversed by an occupant where tour content was presented to the occupant while the repeated segment was traversed.

A vehicle includes a controller configured to generate autonomous commands for the vehicle with an altered route such that the destination is maintained and the repeated segment is replaced with an alternate segment having unobserved tour content for the occupant. The autonomous commands are generated responsive to receiving a route including a destination for the vehicle and a repeated segment previously traversed by an occupant where tour content was presented to the occupant while the repeated segment was traversed.

A method includes presenting tour content associated with the segment and unobserved by the occupant while the segment is traversed such that tour content is not repeated for travel routes traversing the segment during the period. The tour content is presented responsive to receiving a travel route for a vehicle having a segment previously traversed by an occupant where tour content was presented to the occupant during a period.

DETAILED DESCRIPTION

Figure 1:
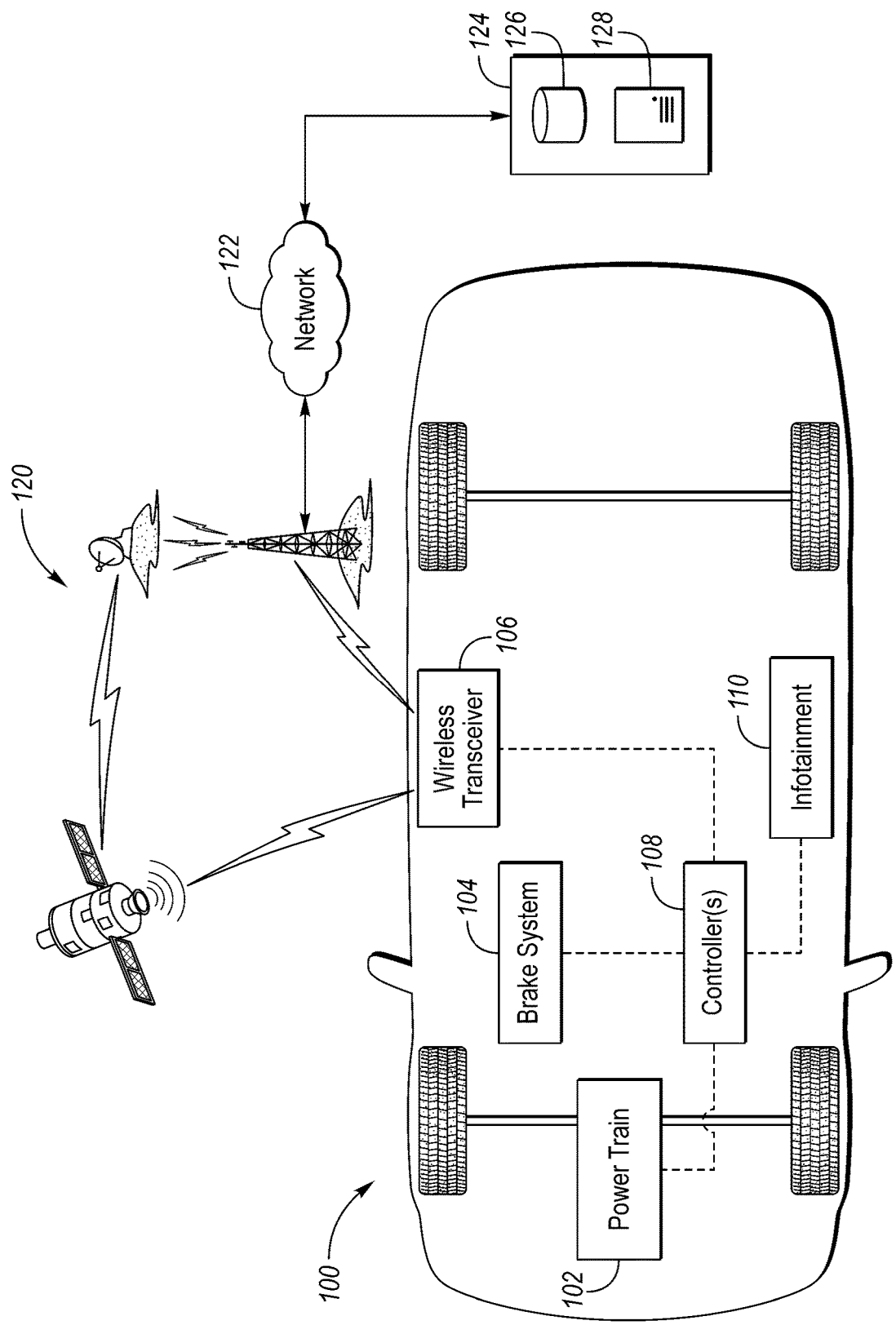
FIG. 1 is a schematic of a vehicle and communication systems.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Tour content may be presented to occupants of a vehicle through various vehicle systems. For example, an infotainment system may produce sound to communicate with occupants through language or music. The infotainment system may describe points of interest along a route to the occupants. A script may read text-to-speech translations or live recording may be presented. For example, the infotainment system may state, "Please look to your left to see Greenfield Village," and further describe Greenfield Village. The infotainment system may also produce graphics to communicate with occupants visually. The infotainment system may include pictures or videos of points of interest along the route for identification. For example, the infotainment system may display a picture of Greenfield Village for easy identification by occupants. Other occupant senses may be utilized to provide tour content (e.g., touch, smell). The infotainment system may further include a mobile device of the vehicle or the occupant. Communication between the mobile device and the vehicle may occur through short-range communications (e.g., near-field, BLUETOOTH).

Tour content may be selected from a repository. The repository may be stored onboard or offboard the vehicle. The vehicle may communicate with the repository through a network. The tour content may be selected using machine learning algorithms (e.g., Bayes, nearest neighbor) to suit the occupant. For example, the occupant may select from a variety of preferred content categories (e.g., fashion, World War II history, black history, industrial information, activities, events). Occupants may select preferred content categories through voice recognition, gestures, vehicle displays, personal mobile devices or other means. Meaning, the system can learn the occupant's preferences instead of the preferences being predetermined. The current tour content may be liked or disliked by the occupants to improve occupant selections. The selections may be made via a tour content application as part of the infotainment system, meaning the application may be on a mobile device. The selections may be associated with the occupant through a username or identifier. The selections may isolate the preferred content categories so that only preferred tour content is provided to the occupant.

The vehicle may be provided with a global position system (GPS) information and route planning services. The information and services may be provided from onboard or offboard the vehicle. The occupant may select a destination before or after boarding the vehicle. A route may be planned and selected based on the vehicle's current position and the destination. The route selected may be the shortest duration available from a plurality of routes. The route may be selected based on different criteria and constraints (e.g., shortest, time-constrained, estimated time of arrival, overall distance). The route may be selected using the shortest route or the highest number of points of interest within the constraint.

An algorithm may be used to associate the route with points of interest along the route or viewable while the route is traversed. For example, the points of interest may be flagged in the repository with the roads or road segments from which the point of interest may be seen. The infotainment system may determine which points of interest are most closely associated with the preferred content categories and reserve a segment of the route corresponding with a duration of the selected tour content for that segment. For example, the tour content for Greenfield Village may have eight distinct clips, each lasting 30 seconds. The segment of the route traversing Greenfield Village may have an estimated duration of two minutes when adjusted for traffic, lights, weather, etc. The infotainment system may then play four 30-second tour content clips that are most relevant to the occupant based on the machine learning algorithm. The machine learning algorithm may include the likes and dislikes of other occupants traversing similar routes, if the interests are similar, in order to generate collaborative filtering. Indication of the clips that were presented to the occupant is recorded.

As an example, the route origin may be the occupant's hotel, and the route destination may be a conference the occupant is attending for the week. Instead of repeating the same four tour content clips, the infotainment system compares the content observed by the occupant, as associated by username, rejects the use of the repeated content, and presents the other four 30-second clips of tour content to the occupant. Indeed, the infotainment system does not repeat tour content for travel routes traversing the segment.

The infotainment system may select a route having the same or a similar duration overall that replaces one of the clips with repeated tour content such that new content is presented to the occupant. Meaning, the occupant will be presented with unobserved tour content by using a route that does not substantially increase the length or duration of his or her trip. As an example, the Greenfield Village may have a circular or ovoid perimeter including roadways. The circular or ovoid perimeter may allow an occupant to travel around either side of Greenfield Village without adding to the duration of the overall trip. The route may be selected by analysis of unobserved tour content related to Greenfield Village such that the duration is maintained and the occupant receives unobserved tour content.

Referring to FIG. 1, a vehicle 100 is shown. The vehicle 100 may include various systems and components to propel and control the vehicle. The vehicle may be an autonomous vehicle or occupant driven. The vehicle may include a power train 102 and a brake system 104. The power train 102 and brake system 104 may be controlled by a controller 108. The controller or group of controllers 108 may steer or direct the vehicle and generate autonomous commands for the vehicle. The commands may include speed, direction, obstacle avoidance, or any other command required for autonomous control. The controller may further receive route information from an infotainment system 110. The infotainment system 110 and controllers 108 may be further in communication with a wireless transceiver 106. It should be appreciated that the infotainment system 110, controllers 108, and wireless transceiver 106 may be one or many independent controllers or computer systems collectively configured to provide the required functions.

The wireless transceiver 106 may be in communication with a network 122 via various transmission mediums and structures 120 (e.g., satellite, radio tower, ground arrays). Via the network 122, the transceiver 106 may exchange messages with a cloud server 124. The cloud server 124 may include a data store or repository 126 and a processing system 128. The cloud server 124 may provide tour content and route information to the vehicle 100 and its occupants. The exact location of the server is not germane to this application. The server 124 may be in the cloud, located on the vehicle, or otherwise disposed. Further, the infotainment system 110 may include mobile devices of the vehicle 100 or may only comprise mobile devices of the vehicle occupants. Meaning, the tour content may be provided by the vehicle itself or on a mobile device of the occupant.

Figure 2:
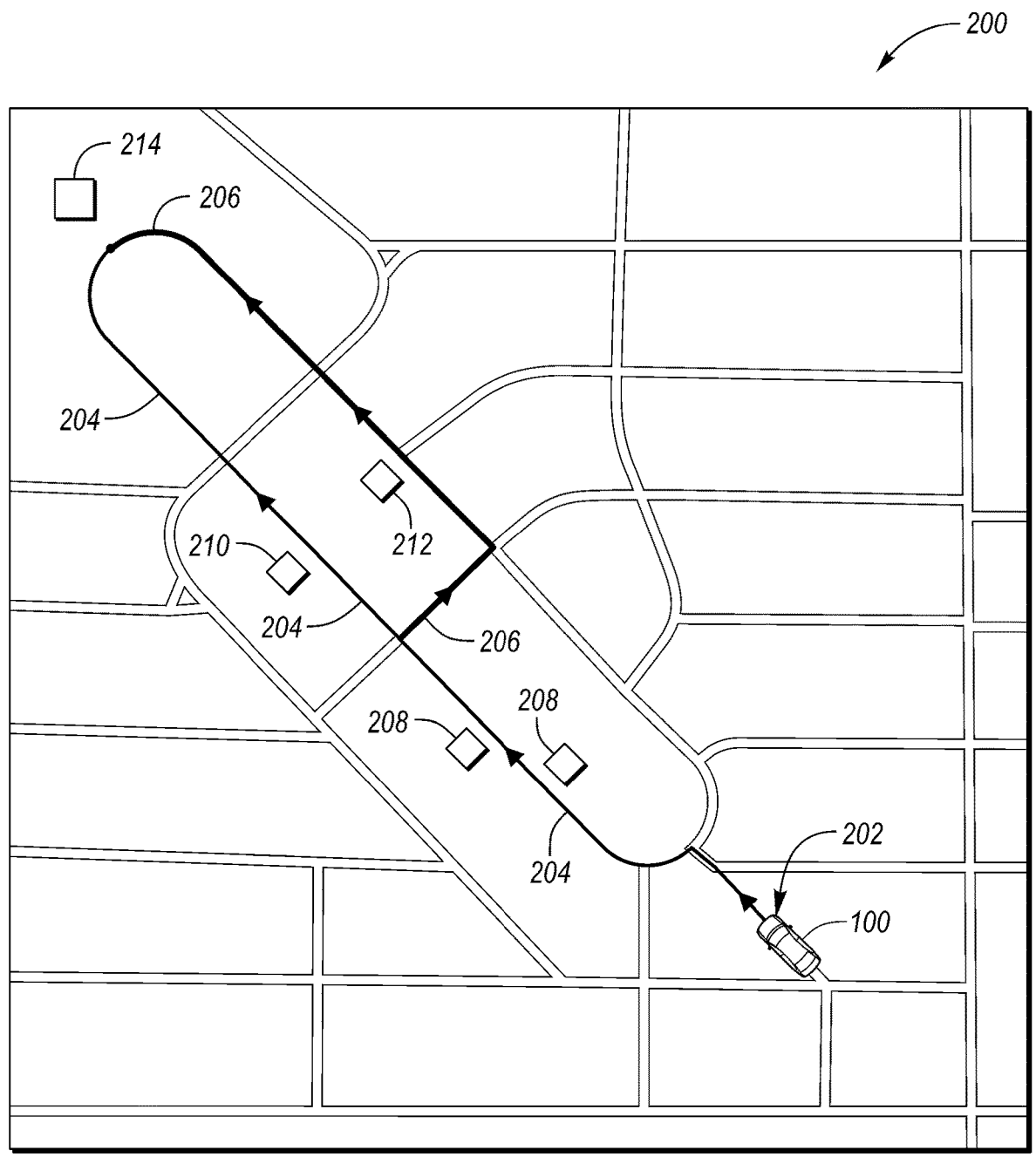
FIG. 2 is a map of a travel route having repeated segments and an altered route each having points of interest.

Referring to FIG. 2, a map 200 is shown. The map includes various roads, streets, and paths available for travel by the vehicle 100. The vehicle 100 receives a travel route 204 from the wireless transceiver 106 or calculates the travel route 204 onboard based on the vehicle origin 202 and the destination 214. Along the route 204, the vehicle 100 pass near points of interest 208. Tour content associated with the points of interest 208 may prompt tour content to be presented to the occupant. Each point of interest 208 may include multiple distinct content clips. Should the vehicle subsequently repeat the route, different content clips may be presented to the occupant. The route 204 may further traverse past point of interest 210. Only one tour content clip may be associated with point of interest 210. The clip associated with point of interest 210 may be therefore repeated if the vehicle traverses route 204 again with the same occupant. The controller 108 or infotainment system 110 of the vehicle 100 may request or generate an altered route 206 such that the tour content clip associated with point of interest 210 is not repeated. Meaning, altered route 206 would include point of interest 212 and the tour content clip associated with point of interest 212. Although only two routes 204, 206 are shown, multiple routes having substantially similar destinations and durations may be used. A substantially similar duration may be based on a percentage of length. For example, the duration of the altered route 206 must be with 95% of the original route 204. The durations may include weather, traffic, or other impediments to travel. Meaning, the duration may be an estimate of an anticipated duration. Further, the play time of the clip associated with the points of interest may be within a predetermined threshold of one another. For example, the duration of the clip associated with the altered route may have a length that does not deviate beyond 5% of the length of the clip associated with the original route.

Figure 3:
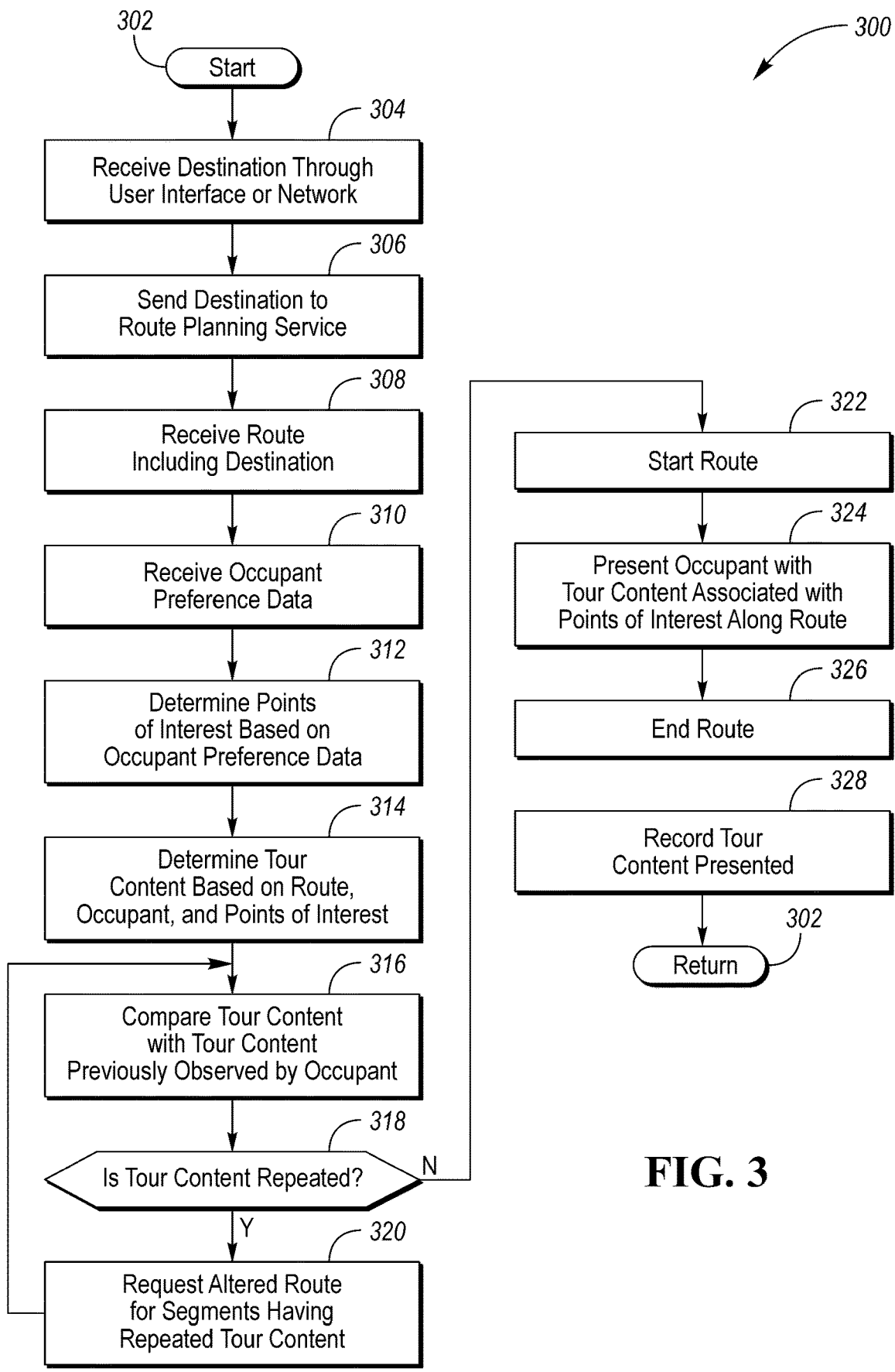
FIG. 3 is an algorithm for ensuring unobserved content is presented to vehicle occupants.

Referring to FIG. 3, an algorithm 300 is shown. Any steps in the algorithm 300 may be omitted or rearranged. In step 302 the algorithm begins. In step 304, the controller 108 may receive the destination through a user interface or network 122. In step 306 the destination is sent to a route planning service. The route planning service may provide multiple routes 204, 206 for selection in step 308. Either in parallel with the route planning service or sequentially before or after, an onboard (infotainment 110) or offboard (server 124) system may receive user or occupant preferential information in step 310. The preferential information may be based on occupant mobile device behavior or previous locations.

In step 312, the system may determine points of interest based on the occupant preference data. In step 314, the system may determine tour content and tour content clips to be presented to the occupant while the route is traversed. The tour content may be based on the route, the occupant preferences, and the points of interest along the route. The tour content may be organized and selected according to a preference score. The route may be determined based on the points of interest receiving a highest aggregate preference score. The aggregate preference score may be based on the occupant preferences. Meaning, routes having the most points of interest related to the occupants selected interests are chosen by the system.

In step 316, the infotainment system 110 determines whether the tour content intended to be presented along the route was previously observed by the occupant. The server 124 may check whether the content intended to be presented was flagged as observed in the repository 126. If repeated tour content is detected in step 318, the system will request an altered route for segments having repeated tour content in step 320. If unobserved tour content is unavailable for points of interest along the alternate segment, the infotainment system may present tour content associated with the repeated segment while the alternate segment is traversed. If unobserved tour content is unavailable for points of interest along the alternate segment, the infotainment system may present tour content that is generally associated with the route and not the segment specifically while the alternate segment is traversed. Meaning, unobserved content will be presented to the occupant that is related to upcoming points of interest or previously traversed segments of the route. Further, a period or duration of the altered route is within a predetermined threshold of a period or duration of the repeated segment.

If tour content is unobserved by the occupant in step 318, the vehicle will generate autonomous vehicle commands to start the route in step 322. As the vehicle traverses segments of the route having tour content, the occupant is presented with unobserved tour content associated with the points of interest in step 324. In step 326, the route is ended. In step 328, notification of the tour content presented and observed by the occupant is sent to the server 124 for recording associated with the occupant's username or identification number. In step 330, the algorithm returns to start 302.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method comprising:
responsive to receiving a route having a destination of a vehicle and a repeated segment previously traversed by an occupant where tour content was presented to the occupant while the repeated segment was traversed, generating by a controller autonomous commands for the vehicle with an altered route such that the destination is maintained and the repeated segment is replaced with an alternate segment having unobserved tour content for the occupant, wherein a duration of the route associated with the destination is maintained with the altered route.

2. The method of claim 1 further comprising responsive to unobserved tour content being unavailable for points of interest along the alternate segment, presenting tour content associated with the repeated segment while the alternate segment is traversed.

3. The method of claim 1 further comprising responsive to unobserved tour content being unavailable for points of interest along the alternate segment, presenting tour content associated with the route while the alternate segment is traversed.

4. The method of claim 1, wherein the unobserved tour content is associated with points of interest along the alternate segment.

5. The method of claim 1, wherein the alternate segment is selected from a plurality of potential segments having an occupant preference score.

6. The method of claim 5, wherein the occupant preference score is based on a machine learning algorithm that includes occupant interest selections.

7. The method of claim 1, wherein the altered route is such that a period of the alternate segment is within a predetermined threshold of a period of the repeated segment.

8. The method of claim 7, wherein the unobserved tour content has a play time within a predetermined range of the period of the alternate segment.

9. A vehicle comprising:
a controller configured to, responsive to receiving a route including a destination for the vehicle and a repeated segment previously traversed by an occupant where tour content was presented to the occupant while the repeated segment was traversed, generate autonomous commands for the vehicle with an altered route such that the destination is maintained and the repeated segment is replaced with an alternate segment having unobserved tour content for the occupant, wherein the altered route is such that a period of the alternate segment is within a predetermined threshold of a period of the repeated segment.

10. The vehicle of claim 9 further comprising responsive to unobserved tour content being unavailable for points of interest along the alternate segment, presenting tour content associated with the repeated segment while the alternate segment is traversed.

11. The vehicle of claim 9 further comprising responsive to unobserved tour content being unavailable for points of interest along the alternate segment, presenting tour content associated with the route while the alternate segment is traversed.

12. The vehicle of claim 9, wherein the unobserved tour content is associated with points of interest along the alternate segment.

13. The vehicle of claim 9, wherein the alternate segment is selected from a plurality of potential segments having an occupant preference score.

14. The vehicle of claim 13, wherein the occupant preference score is based on a machine learning algorithm that includes occupant interest selections.

15. The vehicle of claim 9, wherein a duration of the route associated with the destination is maintained with the altered route.

16. The vehicle of claim 9, wherein the unobserved tour content has a play time within a predetermined range of the period of the alternate segment.

17. A method comprising:
  responsive to receiving a travel route for a vehicle having a segment previously traversed by an occupant where tour content was presented to the occupant during a period, presenting tour content associated with the segment and unobserved by the occupant while the segment is traversed such that tour content is not repeated for travel routes traversing the segment during the period, wherein the tour content associated with the segment has a play time within a predetermined range of the period of the segment.

18. The method of claim 17, wherein unobserved tour content is associated with a same point of interest as the tour content that was presented.

* * * * *